(12) United States Patent
Gray (10) Patent No.: US 9,083,845 B2
(45) Date of Patent: Jul. 14, 2015

(54) GLOBAL ARMING METHOD FOR IMAGE PROCESSING PIPELINE

(75) Inventor: Malcolm Gray, Sunnyvale, CA (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 806 days.

(21) Appl. No.: 13/313,588

(22) Filed: Dec. 7, 2011

(65) Prior Publication Data

US 2012/0162460 A1 Jun. 28, 2012

Related U.S. Application Data

(60) Provisional application No. 61/426,970, filed on Dec. 23, 2010, provisional application No. 61/426,975, filed on Dec. 23, 2010.

(51) Int. Cl.
*H04N 5/14* (2006.01)
*G06T 1/20* (2006.01)
*G06F 12/08* (2006.01)
*H04N 5/232* (2006.01)
*G06T 7/20* (2006.01)

(52) U.S. Cl.
CPC ............ *H04N 5/145* (2013.01); *G06F 12/0891* (2013.01); *G06T 1/20* (2013.01); *G06T 7/2026* (2013.01); *G06T 7/2033* (2013.01); *G06T 7/2073* (2013.01); *H04N 5/23254* (2013.01); *G06T 2207/10016* (2013.01); *G06T 2207/20016* (2013.01); *G06T 2207/20021* (2013.01)

(58) Field of Classification Search
USPC .................................................. 345/501–522
See application file for complete search history.

(56) References Cited

U.S. PATENT DOCUMENTS

| | | | | |
|---|---|---|---|---|
| 5,748,947 | A * | 5/1998 | Fukushima | 345/501 |
| 6,118,461 | A * | 9/2000 | Taylor | 345/520 |
| 6,323,916 | B1 * | 11/2001 | Meguro | 348/714 |
| 7,165,133 | B2 * | 1/2007 | Takeuchi et al. | 710/110 |
| 7,512,021 | B2 * | 3/2009 | Houda et al. | 365/189.12 |
| 8,427,485 | B2 * | 4/2013 | Shinomiya | 345/501 |
| 2002/0033900 | A1 * | 3/2002 | Honma et al. | 348/581 |
| 2002/0048410 | A1 | 4/2002 | So et al. | |
| 2002/0145601 | A1 * | 10/2002 | Mino et al. | 345/211 |
| 2003/0081858 | A1 | 5/2003 | Rathnam et al. | |
| 2005/0105738 | A1 * | 5/2005 | Hashimoto | 380/277 |
| 2005/0172294 | A1 * | 8/2005 | Kanemura et al. | 718/107 |
| 2006/0170692 | A1 * | 8/2006 | Sukeno et al. | 345/547 |
| 2007/0061661 | A1 * | 3/2007 | Ries et al. | 714/746 |
| 2007/0076796 | A1 | 4/2007 | Shi et al. | |
| 2008/0052534 | A1 * | 2/2008 | Harada et al. | 713/190 |
| 2009/0213257 | A1 * | 8/2009 | Nojima | 348/302 |

(Continued)

*Primary Examiner* — Michael Osinski
(74) *Attorney, Agent, or Firm* — F. Chau & Associates, LLC (57) ABSTRACT

Each unit among a pipeline of image processing units receives a new configuration vector (update), and the received new vector is only applied in sync with the Timing-derived trigger signal within a hardware-enabled time period. A hardware enable signal is logically combined with a Timing-derived triggering event signal to control a switch that applies the new received vector to the processing unit. This ensures that each image processing unit (stage) in the chain of image processing units is updated in sequence even if the CPU has output the updated configuration vectors independently of the Timing of the Data and without regard for the delay through each of the processing units. The Timing-derived triggering event is used to synchronize the application of a received configuration vector update with the receipt by the unit of a new frame of image DATA.

9 Claims, 5 Drawing Sheets

(56) References Cited

U.S. PATENT DOCUMENTS

| | | |
|---|---|---|
| 2009/0220154 A1* | 9/2009 | Daidoh .................. 382/182 |
| 2010/0005264 A1* | 1/2010 | Ito et al. ................. 711/163 |
| 2010/0238183 A1* | 9/2010 | Sakanaka et al. ........ 345/501 |
| 2010/0321394 A1* | 12/2010 | Shinomiya ............. 345/501 |
| 2011/0216247 A1* | 9/2011 | Nishida .................. 348/725 |
| 2012/0188224 A1* | 7/2012 | Lee et al. ............... 345/214 |
| 2013/0036426 A1* | 2/2013 | Igura ..................... 718/108 |
| 2013/0155036 A1* | 6/2013 | Kim et al. .............. 345/204 |
| 2013/0215090 A1* | 8/2013 | Kim et al. .............. 345/204 |
| 2013/0286003 A1* | 10/2013 | Park et al. .............. 345/214 |

* cited by examiner

GLOBAL ARMING METHOD FOR IMAGE PROCESSING PIPELINE

CROSS-REFERENCE TO RELATED APPLICATION

This application claims priority under 35 U.S.C. §120 to U.S. Provisional Application No. 61/426,970, and 61/426,975, both filed in the U.S. Patent and Trademark Office on Dec. 23, 2010. The disclosures of both provisional applications are incorporated by reference herein.

TECHNICAL FIELD

The present inventive concept relates to an image processing circuit having a plurality of processing units and a digital camera having the image processing circuit. More particularly, exemplary embodiments of the present inventive concept relate to configurable image processing circuits with a plurality of configuration vectors.

DISCUSSION OF THE RELATED ART

High performance digital and video cameras are in great demand, both as standalone consumer products and as features embedded in mobile devices such as cellular phones, and mobile computers. Each digital camera may include an image processing circuit comprising a plurality of cascade-connected image processing cores configured to receive and process image data under the control of a central processing unit (CPU). The operation of each image processing core may be controlled by the CPU using a configuration vector containing configuration information including the image data's frame size.

Image sensors commonly used in digital cameras may be a RAW-Bayer and/or CMOS type, operated by an image processing unit via a CMOS Sensor Interface (CSI). Increasing demand for higher image resolutions is pushing the bandwidth capacity of processor-to-camera sensor interfaces beyond their capability to perform effectively. Modern high-speed serial interfaces address many of the shortcomings of parallel interfaces but have compatibility issues among manufacturers. Proprietary interfaces have prevented devices from different manufacturers from working together and resulted in industry fragmentation.

The MIPI Alliance is a non-profit corporation developing interface specifications that drive consistency in processor and peripheral interfaces. MIPI (Mobile Industry Processor Interface) is an industry consortium that defines standards for the interface between modules of a mobile device. MIPI has been developing specifications (standards) since it began working on a camera interface in 2005. MIPI publishes specifications defining nearly every chip interface in a mobile system. One of those standards is CSI2, defining the Camera Serial Interface (CSI). There has been strong interest in MIPI CSI-2 among manufacturers of all computing and consumer electronic devices with an image sensor. MIPI's CSI-2 and CSI-3 standards provide the entire electronics industry, not just mobile devices, high-speed, low-power, cost-effective, and scalable interconnections.

Each processing unit connected by an MIPI interconnection works on a whole frame of data, and the timing of the frame's Data is typically indicated by a Timing signal which is input to and delayed through each unit. Each unit uses a configuration vector V to control its processing. The configuration vector is typically 'written' by a processor, either on-chip or off-chip, and controls many aspects of the operation of the processing unit, including the size of the frame of the Data.

A new configuration vector to be updated for each unit must be applied at or before the unit starts processing the frame and remain constant in each unit while the unit processes the whole frame. If all image processing units cascaded in a serial arrangement are updated exactly at the same time, due to the delay through each of them, the update may be applied while one or more of the units are processing a frame. In such instance, the configuration vector shall not have remained constant in those units while they process a frame, and data corruption may occur. For example: in a series of processing units, the horizontal width is typically part of the configuration vector, and if the data received for a particular frame does not match the configuration vector, then the unit will not process the image data correctly. If the image size (e.g., horizontal width) changes between frames to be sequentially processed, then each processing unit would need to receive the new configuration vector synchronized with the time that it receives the image Data delayed through the preceding processing units.

The CPU will be greatly burdened and unavailable for other processing tasks if it is required to keep track of the Timing of the Data and of the delay through each of the MIPI-connected image processing units in order to update all the units at the proper moments. It would likewise be inefficient and would perhaps cause a loss of image Data from the image sensor to stop the whole pipeline of processing units, to apply the new configuration vectors, and then to restart the processing units, and/or to rely on interrupts from each unit indicating when the configuration vector can be changed, and hoping that the CPU can respond fast enough.

It is desirable to ensure that an updated configuration vector is applied to each MIPI-connected processing unit in sync with the Timing and the delay of image Data delayed through each previous processing unit, without burdening the CPU and with minimal interruption to the operation of the image processing units.

SUMMARY

An aspect of the present inventive concept provides an enable-logic circuit that interlocks with a Timing-derived triggering event so that each image processing unit (stage) in the chain of image processing units is updated in sequence, even if the CPU has output the updated configuration vectors independently of the Timing of the Data and without regard for the delay through each of the processing units. The Timing-derived trigger signal is used to synchronize the application of a received configuration vector update with the receipt by the unit of a new frame of image Data. The hardware enable signal passed from each unit to the next unit is passed in parallel with the flow of image Data and its corresponding Timing signals, and indicates if a trigger signal derived from the Timing signal should be enabled as an active trigger event for updating an active configuration vector register, such that the hardware-enabled trigger activation cascades from the first unit in the chain down-stream to each of the following units.

An aspect of the inventive concept provides an image processing circuit comprising a plurality of video processing units. Each video processing unit includes an active configuration vector register for storing an active configuration vector that configures a video processing core of the video processing unit, and also a buffering configuration vector register for storing the configuration vector update that will be transferred into the active configuration register, and thus become the active configuration vector, based on an update-enable signal. Each video processing unit also includes a logic circuit for generating the update-enable signal by combining a trigger signal and a received hardware enable signal, wherein the trigger signal is time dependent upon a video frame sync signal.

In an exemplary embodiment, a hardware interlock logic 'arms' and disarms each stage in the pipeline so that a received configuration vector update is applied in sync with the Timing-derived trigger signal at an appropriate time. The transfer of the configuration vector updates into each stage becomes 'armed' (enabled) after the previous stage has been armed and triggered. In an exemplary embodiment, each processing unit receives an enable signal which may be generated by the previous unit, which indicates whether the current Timing-derived triggering event should be honored or ignored. Thus each processing unit feeds forward to the following processing unit a hardware-enable signal HWEN signal to indicate whether the following unit should honor or ignore its Timing-derived triggering event.

Exemplary embodiments of the present inventive concept also provide an image processing circuit comprising a plurality of image processing units cascade-connected to each other, each unit comprising a first configuration vector register for controlling the operation of the unit; a second configuration vector register for storing a configuration vector update, wherein the output of the second configuration vector register is input to the first configuration vector register through a switching unit while a switch-enable signal of the unit is active; and a combinatorial logic circuit configured to generate the switch-enable signal of the unit by combining a trigger signal of the unit and a received hardware enable signal.

An image processing circuit according to an embodiment of the present inventive concept comprises: a plurality of video processing units, each unit comprising: a first configuration vector register for storing an active configuration vector that configures a video processing core of the video processing unit; a second configuration vector register for storing a configuration vector update; a switching unit connected between the first and second configuration vector registers for transferring the stored configuration vector update into the first configuration register based on an update-enable signal; and a logic circuit for generating the update-enable signal by combining a trigger signal and a hardware enable signal, wherein the trigger signal is time dependent upon a video frame sync signal.

The image processing circuit further including a latch configured to latch the update-enable signal and to output the latched update-enable signal as the hardware enable signal received by the next video processing unit. The switching unit, the logic unit, and the latch are configured to pass the hardware enable signal from each unit to the next unit in parallel with the flow of image data and the hardware-enabled trigger activation cascades from the first unit in the chain down-stream to each of the following units.

According to an aspect of the inventive concept, the hardware enable signal received by the first video processing unit originates from a CPU control register, and the first video processing unit receives the hardware enable signal via an I/O pin.

A method is also provided for sequentially processing a first frame of image Data and second frame of image Data through a plurality of cascade-connected image processing units, the method comprising a receiving the first frame of image Data in the first one of the image processing units writing a configuration vector corresponding to the first frame of image Data into an active configuration vector register of the first image processing unit while an update enable signal is active; and generating the active update enable signal by combining a trigger signal derived from a Timing signal corresponding to the first frame of image Data and a hardware enable signal, wherein the Timing signal includes a video frame sync signal.

The method further comprising before the update enable signal is active, writing the configuration vector corresponding to the first frame of image Data into a buffer configuration vector register of the first image processing unit, wherein the trigger signal is derived from the video frame sync signal.

An image processing circuit comprising a plurality of video processing units, each unit comprising a first configuration vector register for storing an active configuration vector that configures a video processing core of the video processing unit; a second configuration vector register for storing a configuration vector update; a pass-gate connected between the first and second configuration vector registers for transferring the stored configuration vector update into the first configuration register based on an update-enable signal; and a logic circuit for generating the update-enable signal by combining a trigger signal and a hardware enable signal, wherein the trigger signal is time dependent upon a video frame sync signal.

The processing units are cascade connected. Each processing unit further includes a latch configured to latch the update-enable signal and to output the latched update-enable signal as the hardware enable signal received by the next processing unit.

The hardware enable signal received by the first video processing unit may originate from a CPU or from a firmware.

The hardware enable signal passed from each unit to the next unit is passed in parallel with the flow of image Data and its corresponding Timing signals, and indicates if a trigger signal derived from the Timing signal should be enabled as an active trigger for updating an active configuration vector register, such that the hardware-enabled trigger activation cascades from the first unit in the chain down-stream to each of the following units.

Another aspect of the invention provides a method of processing a plurality of frames employing a plurality of cascade-connected reprogrammable image processing units, the method comprising controlling the enablement of reprogramming each of the plurality cascade-connected processing units, including passing a reprogramming-enable signal from unit to unit in parallel with the flow of image Data and Timing signals, wherein the reprogramming-enable signal controls whether a trigger signal based on the Timing signals should trigger the reprogramming of the unit, such that the enabled trigger signal cascades from the first unit in the chain down-stream to the following units.

The reprogramming-enable signal received by the first video processing unit may originate from a CPU or from a firmware.

BRIEF DESCRIPTION OF THE DRAWINGS

The above and other features of the present inventive concept will become more apparent by describing in detailed exemplary embodiments thereof with reference to the accompanying drawings, in which.

DETAILED DESCRIPTION OF EXEMPLARY EMBODIMENTS

Figure 1:
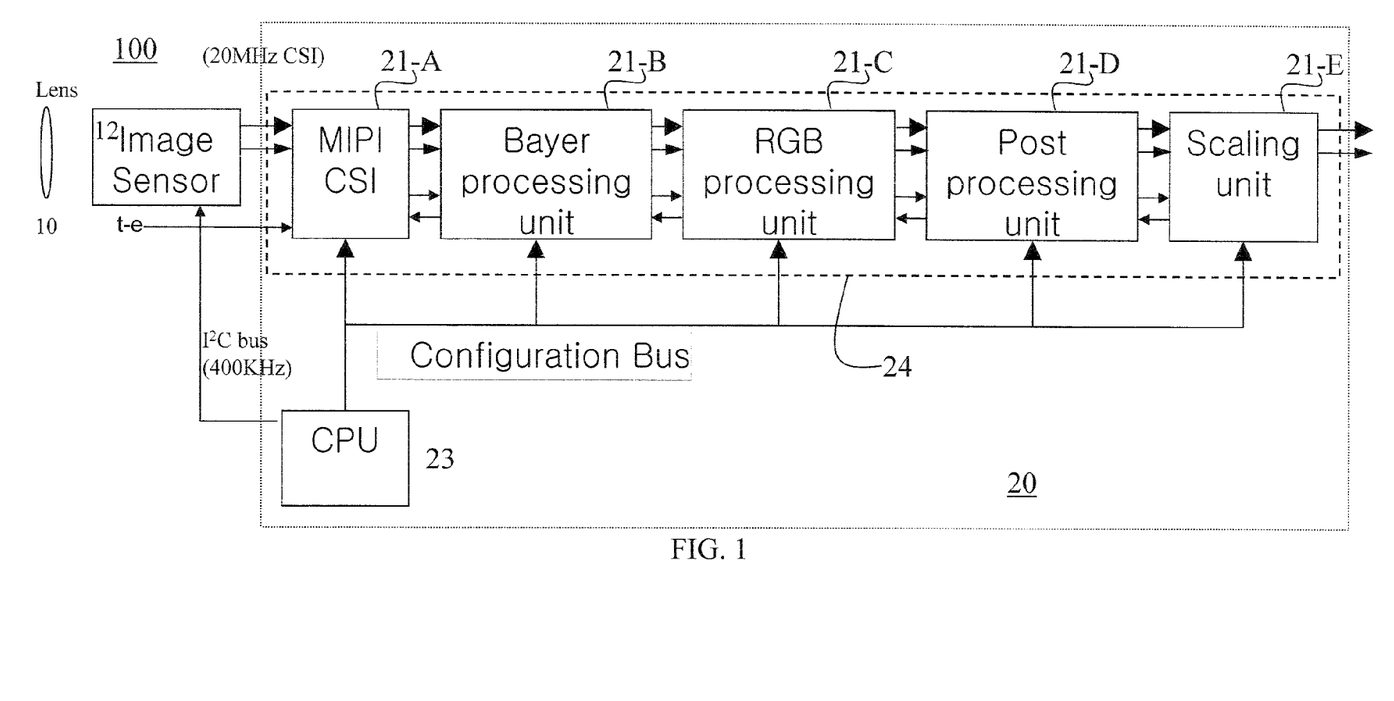
FIG. 1 is a block diagram of a digital camera including an image processing circuit according to an exemplary embodiment of the inventive concept.

FIG. 1 is a block diagram of a digital camera 100 including an image processing circuit 20 comprising a plurality of image processing units 24 (21-A, 21-B, 21-C, 21-D, 21-E) according to an exemplary embodiment of the inventive concept. The digital camera includes a lens 10, an image sensor 12, and an image processing circuit 20 comprising a plurality of pipelined image processing units 24 (21-A, 21-B, 21-C, 21-D, 21-E), and a central processing unit (CPU 23) configured to control the image sensor and each of the image processing units 24 (21-A, 21-B, 21-C, 21-D, 21-E). The image sensor is controlled by the CPU via a databus, such as an I2C bus, while the image sensor transmits image Data to the first processing unit 21-A via a MIPI CSI. The operational speed of the I2C bus may be in the 400 khz range and the MIPI CSI may operating at much higher speed, e.g., at about 20 MHz. A configuration bus implemented as a second I2C or equivalent bus (e.g., an APB bus) is used to transmit configuration vectors to each of the plurality of processing units 24. Each of the image processing units 21-A, 21-B, 21-C, 21-D, 21-E receives a hardware-enable signal, and the hardware-enable signal received by the first image processing unit 21-A is referred to as a transfer-enable (t-e) signal.

The image sensor 12 may be a RAW-Bayer image sensor implemented as a CMOS image sensor and the first processing unit 21-A may likewise be a MIPI-CMOS Sensor Interface (MIPI-CSI). The second processing unit 21-B may be a Bayer processing unit, the third processing unit 21-C may be a RGB processing unit, the fourth processing unit 21-D may be a post-processing unit, and the fifth processing unit 21-E may be a Scaling/Rotating/Affine-Transform processing unit. It is understood that the type and order of processing units need not adhere to the specific type and order as above described to implement the embodiments of the present inventive concept.

As shown in FIG. 1, the processing circuit 24 may be embodied as an IC chip, configured to receive frames of video images and control signals, e.g., configuration update enable via I/O pins.

Figure 2:
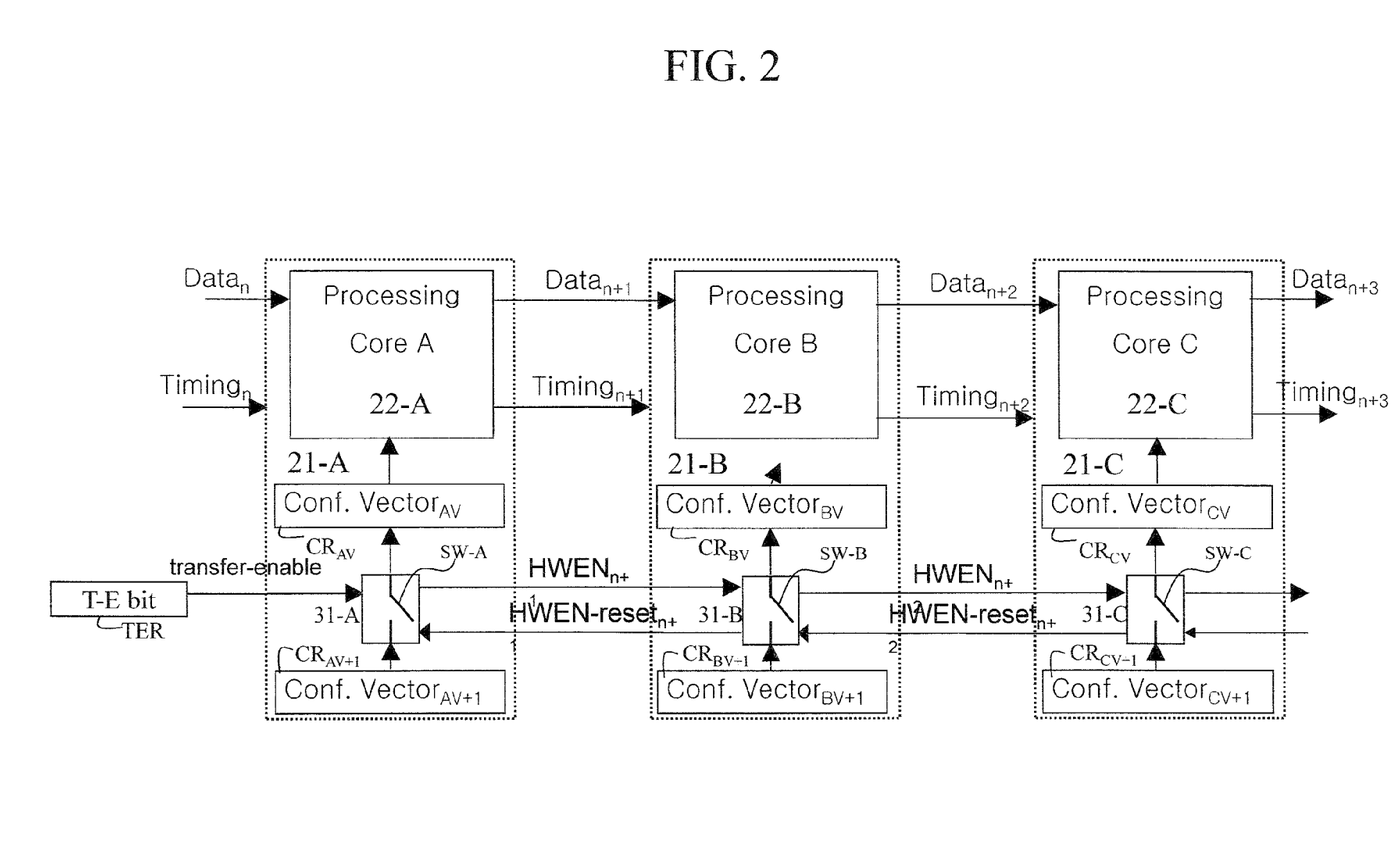
FIG. 2 is a block diagram of a plurality of processing units 24 according to an exemplary embodiment of the present inventive concept.

FIG. 2 is a block diagram of the (A)-th, (B)th, and (C)th processing units 21-A, 21-B, 21-C in an image processing circuit.

Each processing unit (21-A, 21-B, 21-C) receives image Data from an input/output pin or from an upstream processing unit. Each processing unit 21 includes an image processing core 22 (e.g., 22-A, 22-B, 22-C) that processes a frame of image Data and then output to the next downstream processing unit 21. Each unit uses a configuration vector V (where V=A, B, C, corresponding to the unit) to update the configuration of the camera, e.g., image size, color temperature, etc. The timing of each frame of the image Data is indicated by a Timing signal. There is a processing delay time associated with the time needed to process the image Data by the processing core 22. The timing signal is likewise delayed through each unit 22 (see FIG. 3). The configuration vector V (e.g., AV, BV, CV) is 'written' by a processor, which according to an exemplary embodiment, can be on-chip, off-chip, or written by firmware, and controls many aspects of the image including, for example, the size of the image, the depth of the color, etc. The active configuration vector of each processing unit is stored in an active (first) configuration vector register $CR_V$ (e.g., $CR_{AV}$, $CR_{BV}$, $CR_{CV}$) in the processing unit. The updated configuration vector is written by the CPU 23 into a buffering (second) configuration vector register $CR_{V+1}$ (e.g., $CR_{AV+1}$, $CR_{BV+1}$, $CR_{CV+1}$) in the corresponding processing unit, and is held there until a switch SW (e.g., SW-A, SW-B, SW-C) is activated by a switch-enable signal generated by an enable logic circuit 31 (e.g., 31-A, 31-B, 31-C). In alternative embodiments of the inventive concept, the buffer (second) configuration vector register $CR_{V+1}$ (e.g., $CR_{AV+1}$, $CR_{BV}$ $CR_{CV+1}$) in the each processing unit may be implemented as a FIFO buffer (first-in, first-out). When the switch SW (e.g., SW-A, SW-B, SW-C) is activated by the switch-enable signal, the updated configuration vector (update) stored in the second configuration vector register $CR_{V+1}$ (e.g., $CR_{AV+1}$, $CR_{BV+1}$, $CR_{CV+1}$) is copied into the first configuration vector register $CR_V$ (e.g., $CR_{AV}$, $CR_{BV}$, $CR_{CV}$) and becomes the active configuration vector of the processing unit.

The switch-enable signal that closes the switch SW (e.g., SW-A, SW-B, SW-C) in each unit may be based on a logical combination of a trigger-event signal and a transfer-enable hardware-enable signal HWEN received from the previous unit. In the case of the first unit 21A, the transfer-enable signal is from an external circuit, or from the CPU. The trigger-enable signal is derived from the received Timing signal received by the unit. The switch-enable signal that closes the switch SW (e.g., SW-A, SW-B, SW-C) in the first processing unit 21-A is based on a logical combination of a hardware-enable signal. HWEN labeled "transfer-enable" signal received from an external circuit, via a chip I/O pin. The HWEN/"transfer-enable" signal received by the first processing unit 21-A may be generated by the CPU, or in alternative embodiments by a firmware.

The switch-enable signal deactivates (opens) the switch SW (e.g., SW-A, SW-B, SW-C) between the configuration vector registers $CR_V$ and $CR_{V+1}$ in each unit is based on the trigger-event signal (not shown, see FIG. 4) derived from the received Timing signal received by the unit. If the trigger-event signal is a momentary pulse, then the switch SW (e.g., SW-A, SW-B, SW-C) in each unit is activated (closed) momentarily, and while the transfer-enable signal HWEN received from the previous unit is activated. Thus, the transfer of updates stored in the second configuration vector register $CR_{V+1}$ into the first configuration vector register $CR_V$ of each processing units among the plurality of units 24 is synchronized with the Timing signal as-received by each unit, but is also enabled sequentially, regardless of the amount of delay through each MIPI-connected processing unit. This is also accomplished without burdening the CPU or with interrupts. The transfer-enable signal may be based on a Transfer-Enable bit (T-E bit) stored in a transfer-enable register (TER) controlled directly by the CPU or indirectly by firmware controlled by the CPU.

Each processing unit (21-A, 21-B, 21-C) receives a hardware enable signal HWEN from the previous unit (or transfer-enable signal) that controls whether the current trigger-event signal will be honored or ignored. Thus, each unit provides to the following unit a hardware enable signal HWEN to indicate whether it should honor or ignore the triggering event indicated by the Timing information associated with the received image Data. The first unit in the chain, receives its transfer-enable signal from a register called the transfer-enable register (TER) controlled by the CPU or by a firmware. The hardware enable signal HWEN signal is delayed as it is passed down the chain of processing units.

Figure 3:
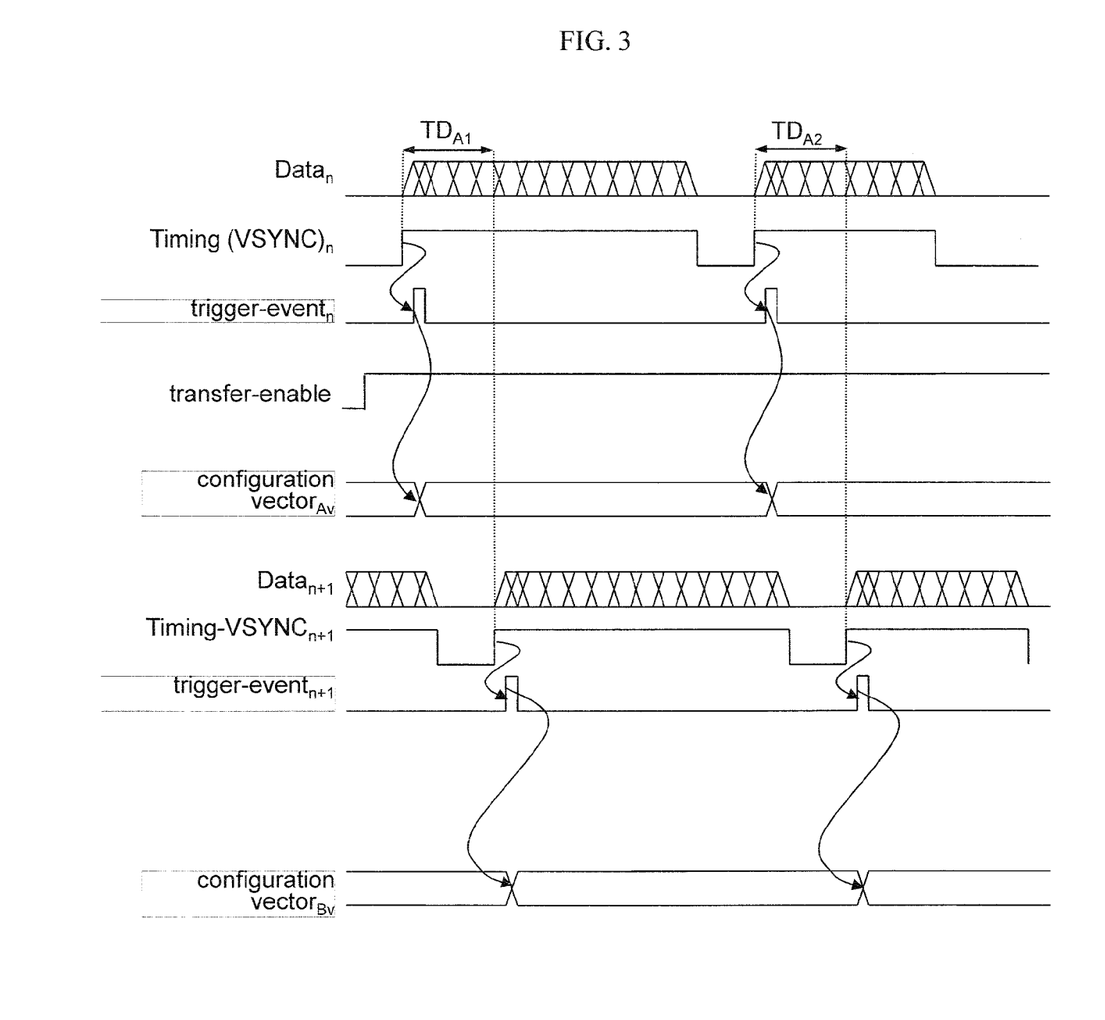
FIG. 3 is a timing diagram of various signals of the image processing circuit during one mode of operation according to an exemplary embodiment of the present inventive concept.

FIG. 3 is a timing diagram of the inputs and outputs and internal signals of the (A)th and (B)th processing units 21-A, 21-B of FIG. 2 in a first mode of operation in the image processing circuit 20 of the digital camera 100 of FIG. 1.

Referring to FIG. 2 and FIG. 3, a hardware enable (interlock) signal HWEN is provided to ensure that each unit in the chain of processing units has its active configuration vector updated in sequence. The interlock 'arms' each stage in the pipeline to the trigger signal, each stage only being 'armed' once the previous stage has been (armed and) triggered. Thus, the new configuration vector V+1 is applied to all the units' registers reliably without stopping the operations of the processor unit pipeline, and without requiring the processor to respond to interrupts in a very short time (real time).

The image sensor 12 may send a parallel video stream, in RAW8, RAW10, RAW12 or user-defined 8-bit (e.g. JPEG). The pixel stream may be preceded by a trigger pulse or sync signal at the beginning of the pixel Data stream. HSYNC is the Video Horizontal Line Synchronization signal. Image Data is valid while HSYNC is high. HBLANK is the inverse of HSYNC. VSYNC is the Video Frame Synchronization signal. VSYNC goes active, e.g., active high, or transitions at the start of the image data frame. The image sensor may generate Frame-Start (e.g., VSYNC goes high) and Frame-End (e.g., VSYNC goes low) trigger pulses. The image sensor may provide a pixel-clock, toggling at the pixel scan frequency (e.g., in the order of 10 to 30 MHz). According to an embodiment of the present inventive concept, the MIPI-CSI connected directly to the image sensor 12 interfaces directly with the RAW-Bayer image sensor 12 and generates CRC and ECC codes, converts the pixels to bytes, and interfaces between clock domains according to the MIPI specification.

Meanwhile, the CPU 23 may continue operating independently of the operations of the image processing units 24 and independently generates configuration vectors (updates) under the control of a user interacting with a user-interface, such as when a user select a different image-frame size or changes a digital zoom coefficient.

As illustrated in FIG. 3, the time span for receiving and processing a first frame of Data may be different than the time span for receiving and processing a subsequent second frame of Data, (e.g., depending on each frame's size). Also a first delay TDA1 of a first frame of Data through a processing unit may be different than a second delay TDA2 of a second frame of Data through the same processing unit. Thus, it would be a burden on the CPU to track the Timing of the Data and the delays through each of the processing units for the purpose of updating their configuration registers.

The new configuration vector (update) V for each unit is to be applied at or before the start of the frame processing begins in each processing unit and remains constant while processing the whole frame of Data. The configuration vector update may be written by the CPU (e.g., into the second configuration vector register $CR_{V+1}$ of each processing unit) at any time independent of the Timing of the image Data. Thus, if the CPU is writing a new configuration vector update into the second configuration vector register $CR_{V+1}$ at the same time that the switch SW is enabled, then the configuration vector transferred into the first configuration vector register $CR_V$ at that moment may be corrupted, and thus image Data corruption may occur.

In a first mode of operation, the transfer-enable signal is held at a constant high (active) state spanning the periods of two or more consecutive image data-frames. In this first mode of operation, the transfer-enable signal may span over multiple frames of Data, the potential for Data corruption when the CPU is writing a new configuration vector (update) into the second configuration vector Register $CR_{V+1}$ is not avoided. In a second mode of operation, the transfer-enable signal is modulated to disable the transfer of configuration vector into the first configuration vector Register $CR_V$ while the CPU is or may be writing a new configuration vector into the second configuration vector register $CR_{V+1}$.

Thus, in the second mode of operation, the new configuration vector (update) is first written by the CPU, and then the triggering event derived from the Timing signal transfers the configuration vector into the first configuration vector register $CR_V$. Alternatively, the transfer-enable bit/signal may be controlled by firmware which is also delegated the task of writing the new configuration vector (update) into the second configuration vector register $CR_{V+1}$. However, transferring updates based only upon a modulation of the transfer-enable signal to control the activation of the switch SW between the first and second configuration vector registers $CR_V$ and $CR_{V+1}$ would permit configuration vector updates to be applied to one or more image processing units mid-frame, and thus may result in data corruption. Accordingly, in both modes of operation of the circuit, the activation of the switch SW in each unit depends upon a logical combination of a hardware-enable signal and the Timing-derived trigger event, or a logical combination of the transfer-enable signal and the Timing-derived trigger event, so that each image processing unit receives the new configuration vector synchronized with the start of the frame of data it is processing. The second mode of operation will be further described below.

Figure 4:
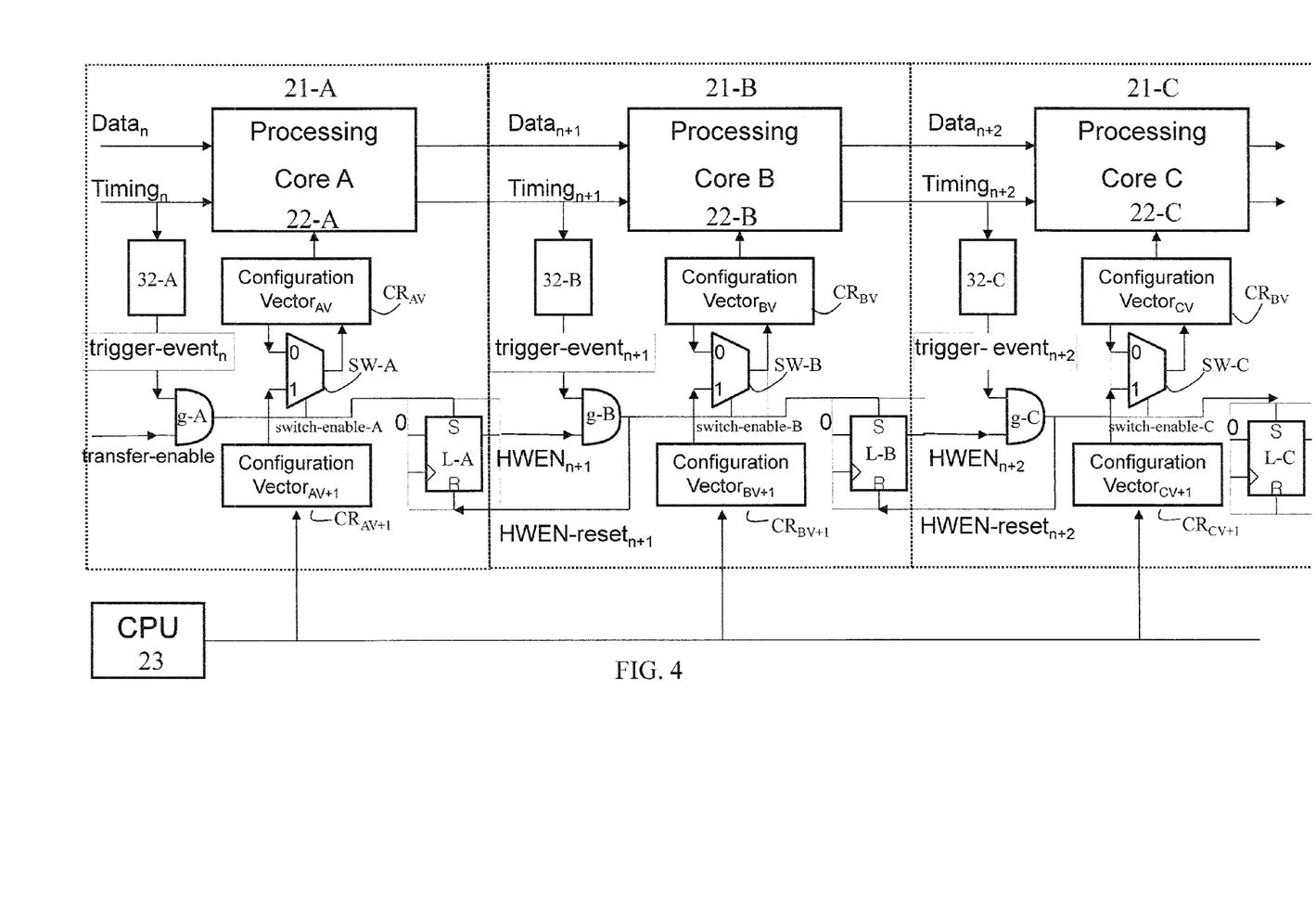
FIG. 4 is a circuit diagram of an update-enabling circuitry of the processing units.

FIG. 4 is a circuit diagram of the update-enabling circuitry 31 (31-A, 31-B, 31-C) of the (A)th and (B)th and (C)th processing units 21-A, 21-B, 21-C of FIG. 2, in the digital camera 100 of FIG. 1. The update-enable logic circuit 31 (e.g., 31-A, 31-B, 31-C) of each unit includes a trigger-event signal generating logic 32 configured to receive the Timing (e.g., VSYNC) signal and to generate therefrom the trigger-event signal that will serve to enable the switch SW (e.g., SW-A, SW-B, SW-C) between the first and second configuration vector registers $CR_V$ and $CR_{V+1}$ before the processing unit begins processing the received frame of image Data, as illustrated in timing diagrams FIG. 3 and FIG. 5. The update-enable logic circuit 31 further includes a combinatorial logic gate g (e.g., g-A, g-B, g-C) to generate the switch-enable signal, e.g., switch-enable-A, switch-enable-b, switch-enable-C, of the image processing unit 21 (21-A, 21-B, 21-C) by logically combining, e.g., logical AND, the HWEN/transfer-enable signal and the trigger-event signal. The switch-enable signal (switch-enable-A, switch-enable-b, switch-enable-C) controlling the update-enabling switch SW (SW-A, SW-B, SW-C) described in this exemplary embodiment is an exemplary implementation of an update-enabling signal ("update-enable signal"), controlling the exemplary switching unit that effects the transfer of a configuration vector update from a buffering second configuration vector into the active first configuration vector register, based on a logical combination of a received hardware-enable and a trigger signal derived from a received Timing signal. When the update-enable signal is active, the configuration vector update that is stored in the second configuration vector register $CR_{V+1}$ is transferred to the active configuration vector register $CR_V$.

The update-enable logic circuit 31 further includes latch L (L-A, L-B, L-C) configured to latch the switch-enable signal and output it as the hardware-enable HWEN signal for use by the next unit. In second and following stages (e.g., units B, C...), the switch-enable signal of each unit is fed back to the latch of the preceding unit as a HWEN-reset signal for resetting the latched switch-enable signal (HWEN) signal output by the previous stage. Thus, for example, the switch-enable-B signal of unit 21-B is fed back to the latch L-A of the preceding unit 21-A, to reset the switch-enable-A signal (HWENn+1) signal output by the preceding unit 21-A. The latch L in each unit may be implemented as an SR latch, having a SET electrode S and a RESET electrode R.

The switch SW (SW-A, SW-B, SW-C) in each unit can be implemented in various ways, such as by a multiplexer, a single-throw switch, having as many poles as there are bits in each configuration vector, or as a semiconductor pass-gate having a transfer path for each bit of the configuration vector.

Figure 5:
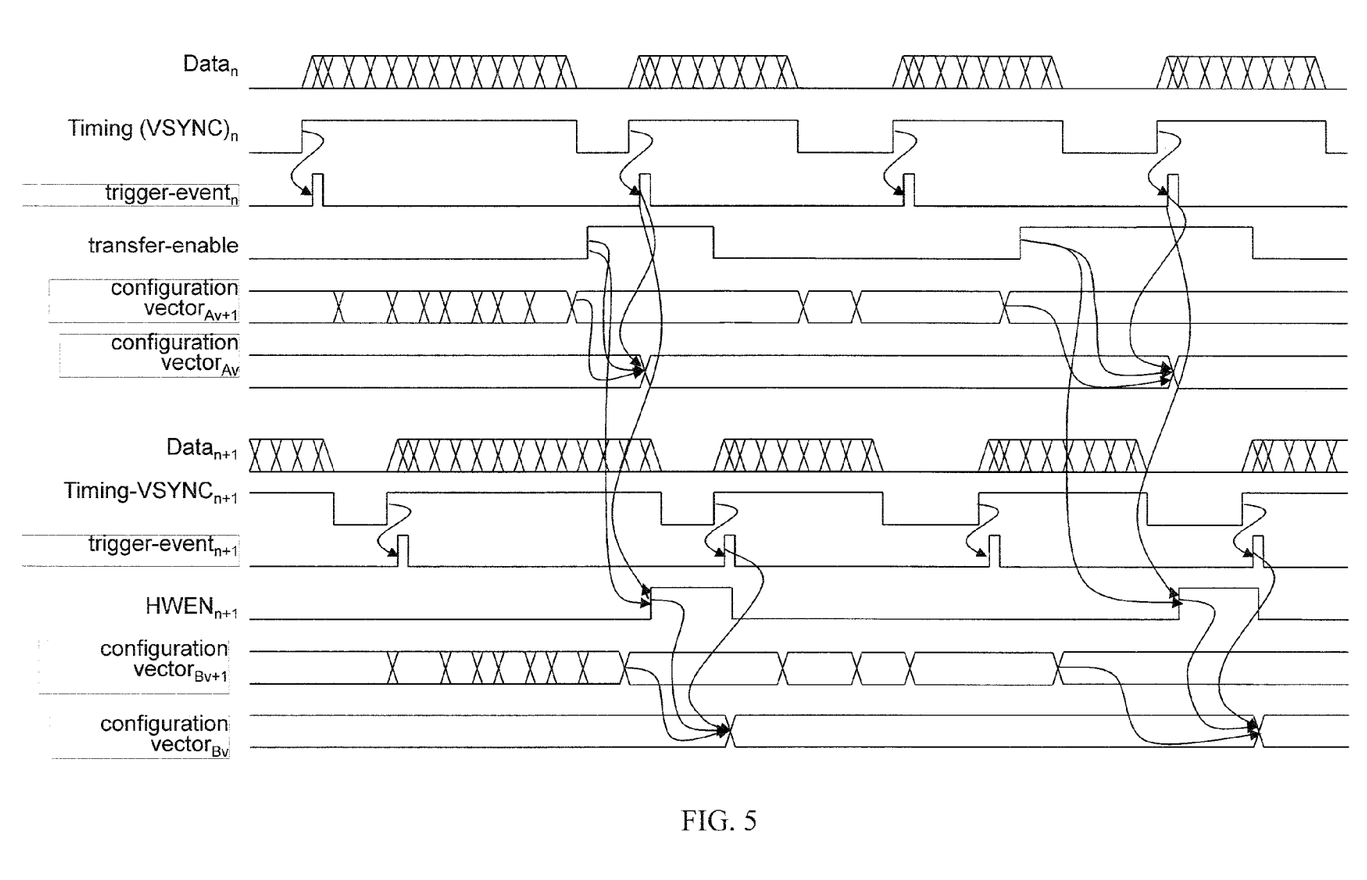
FIG. 5 is a timing diagram of various signals of the processing units in a second mode of operation.

FIG. 5 is a timing diagram of the inputs and outputs and internal signals of the (A)th and (B)th processing units 21-A, 21-B of FIG. 4 in a second mode of operation in the digital camera 100 of FIG. 1. Referring to FIG. 5, according to a second mode embodiment of the present inventive concept, the chain of processing units is updated in sequence after the new configuration vectors have been fully written to all the units' second configuration vector registers $CR_{V+1}$. The interlock 'arms' each stage in the pipeline (chain of processing units) 24 to the trigger signal, each stage only being 'armed' after the previous stage has been armed and triggered.

Referring to FIG. 2, FIG. 4 and FIG. 5, a hardware enable (interlock) signal HWEN is provided at selected times to ensure that each unit in the chain of processing units has its active configuration vector updated in sequence while valid updates are available. The interlock 'arms' each stage in the pipeline to the trigger signal, each stage being 'armed' once the previous stage has been armed and triggered. Thus, the new configuration vector V+1 is applied to all the units' registers reliably without stopping the operations of the processor unit pipeline, and without requiring the processor to respond to interrupts in a very short time.

The CPU 23 may continue operating independently of the operations of the image processing units 24 and independently generates configuration vectors (updates) under the control of a user interacting with a user-interface, such as when a user select a different image-frame size or changes a digital zoom coefficient.

The configuration vector update may be written by the CPU, e.g., into the second configuration vector register $CR_{V+1}$ of each processing unit, at any time independent of the Timing of the image Data. The configuration vector update stored in the second configuration vector register $CR_{V+1}$ of each processing unit will be transferred into the first configuration vector register $CR_V$ in sync with the Timing of the image Data, and while a hardware enable HWEN signal (e.g., transfer-enable, $HWEN_{n+1}$) is received by the processing unit. Thus, the content of the second configuration vector register $CR_{V+1}$ of each processing unit will not be transferred into the corresponding first configuration vector register $CR_V$ every time a trigger-event pulse occurs.

The foregoing is illustrative of the present inventive concept and is not to be construed as limiting thereof. Although a few exemplary embodiments of the present inventive concept have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims.

What is claimed is:

1. An image processing circuit comprising:
   a plurality of image processing units, each unit comprising:
   a first configuration vector register configured to store a configuration vector;
   a second configuration vector register configured to store a configuration vector update, wherein the output of the second configuration vector register is input to the first configuration vector register under control of a first enable signal; and
   a logic circuit configured to generate the first enable signal based on a trigger signal and a second enable signal, and
   wherein the plurality of image processing units are serially connected, each image processing unit further comprising a latch configured to latch the first-enable signal and output a latched first-enable signal as the second enable signal to be received by a following image processing unit, the second enable signal being fed back to the latch of a preceding image processing unit for resetting the latch of the preceding image processing unit.

2. The image processing circuit of claim 1, further including a switching unit configured to receive the configuration vector update and output the configuration vector update to the first configuration vector register.

3. The image processing circuit of claim 1, wherein the trigger signal is time synchronized with the arrival of each frame of image data at the image processing circuit.

4. The image processing circuit of claim 1, wherein the second enable signal received by a first unit among the plurality of image processing units is a transfer-enable signal output by a transfer-enable register that latches a transfer-enable bit.

5. The image processing circuit of claim 4, wherein the transfer-enable bit is written into the transfer-enable register by a central processing unit (CPU).

6. The image processing circuit of claim 1, further comprising a central processing unit (CPU) configured to generate the configuration vector update.

7. The image processing circuit of claim 6, wherein the CPU writes the configuration vector update into the second configuration vector register.

8. The image processing circuit of claim 7, wherein the configuration vector update is not written into the second configuration vector register of any image processing unit while the second enable signal of that image processing unit active.

9. The image processing circuit of claim 1, wherein the trigger signal of the image processing unit is generated within the image processing unit based on a timing signal received by the image processing unit.

* * * * *